US009955341B2

(12) United States Patent
Zhang et al.

(10) Patent No.: US 9,955,341 B2
(45) Date of Patent: Apr. 24, 2018

(54) METHOD FOR PREVENTING CALL-UP OPERATION ERRORS AND SYSTEM USING THE SAME

(71) Applicant: GUANG DONG OPPO MOBILE TELECOMMUNICATIONS CORP., LTD., Dongguan, Guangdong (CN)

(72) Inventors: Qiang Zhang, Dongguan (CN); Lizhong Wang, Dongguan (CN)

(73) Assignee: GUANG DONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 14/903,254

(22) PCT Filed: May 7, 2014

(86) PCT No.: PCT/CN2014/076933
§ 371 (c)(1),
(2) Date: Jan. 6, 2016

(87) PCT Pub. No.: WO2015/003528
PCT Pub. Date: Jan. 15, 2015

(65) Prior Publication Data
US 2016/0150399 A1  May 26, 2016

(30) Foreign Application Priority Data
Jul. 9, 2013  (CN) .......................... 2013 1 0286562

(51) Int. Cl.
*H04W 52/02* (2009.01)
*H04M 1/72* (2006.01)
(Continued)

(52) U.S. Cl.
CPC ............. *H04W 8/22* (2013.01); *G01S 7/4918* (2013.01); *G01S 17/026* (2013.01); *G01S 17/88* (2013.01);
(Continued)

(58) Field of Classification Search
CPC .... H04M 1/725; H04M 1/22; H04M 2250/12; H04M 1/67; H04M 2250/22;
(Continued)

(56) References Cited

U.S. PATENT DOCUMENTS 8,854,335 B2 *  10/2014  Chang ................... G06F 3/0412
345/158
8,923,933 B2 *  12/2014  Hu ..................... H04W 52/0254
455/418
(Continued)

FOREIGN PATENT DOCUMENTS

CN    102917130    2/2013
CN    102946497    2/2013
(Continued)

*Primary Examiner* — Khawar Iqbal
(74) *Attorney, Agent, or Firm* — Kirton McConkie; Evan R. Witt

(57) ABSTRACT

A method for preventing call-up operation errors and system using the same are provided. The method includes the steps of: (S1) a proximity sensor continuously detecting a proximity or distant state of an obstruction; (S2) when detecting that the obstruction approaches, uploading the proximity state in drive program to an upper layer; (S3) when detecting that the obstruction moves far away, the proximity sensor first skipping reporting the distant state at this time, and increasing the transmission power of the proximity sensor; (S4) determining whether the reflection intensity signal exceeds a setting threshold; and (S5) if the obstruction is near the proximity sensor of the mobile phone, the proximity sensor skips uploading the distant state, and the display screen will not light up, if the obstruction is far away from
(Continued)

the proximity sensor, the proximity sensor uploading the distant state and then lighting up the display screen.

14 Claims, 2 Drawing Sheets

(51) Int. Cl.
| | | |
|---|---|---|
| *H04W 8/22* | (2009.01) | |
| *H04M 1/22* | (2006.01) | |
| *G01S 17/02* | (2006.01) | |
| *H04M 1/725* | (2006.01) | |
| *G01S 7/491* | (2006.01) | |
| *G01S 17/88* | (2006.01) | |
| *H04M 1/67* | (2006.01) | |

(52) U.S. Cl.
CPC ......... *H04M 1/22* (2013.01); *H04M 1/72569* (2013.01); *H04M 1/67* (2013.01); *H04M 2250/12* (2013.01); *H04M 2250/22* (2013.01); *H04W 52/027* (2013.01); *Y02B 60/50* (2013.01)

(58) Field of Classification Search
CPC . H04M 1/72569; H04W 8/22; H04W 52/027; Y02B 60/50; G01S 17/02; G01S 17/026; G01S 7/4918; G01S 17/88; G01L 37/02; G01B 7/02
USPC .................................. 455/566, 574
See application file for complete search history.

(56) References Cited

U.S. PATENT DOCUMENTS

| | | | |
|---|---|---|---|
| 2007/0075965 A1 | 4/2007 | Huppi et al. | |
| 2007/0195074 A1* | 8/2007 | Gelissen | G06F 1/3228 345/204 |
| 2011/0006190 A1* | 1/2011 | Alameh | G01S 7/484 250/206.1 |
| 2012/0286965 A1 | 11/2012 | Rautiainen | |
| 2013/0005413 A1* | 1/2013 | Brogle | G01D 5/2405 455/575.7 |
| 2013/0029625 A1* | 1/2013 | Park | H01Q 1/243 455/272 |
| 2013/0033694 A1* | 2/2013 | Puig | G01S 17/02 356/4.07 |
| 2013/0231161 A1* | 9/2013 | Hsu | G09G 3/3406 455/566 |
| 2013/0328842 A1* | 12/2013 | Barnhoefer | G09G 3/3406 345/207 |
| 2014/0146188 A1* | 5/2014 | Ju | H04N 5/23229 348/207.1 |
| 2014/0148227 A1* | 5/2014 | Choi | H04N 5/23241 455/574 |
| 2014/0152121 A1* | 6/2014 | Ku | H04M 1/72519 307/116 |
| 2014/0206297 A1* | 7/2014 | Schlub | H01Q 1/243 455/77 |
| 2014/0302893 A1* | 10/2014 | Dhavaloganathan | H04M 1/72577 455/566 |
| 2014/0315592 A1* | 10/2014 | Schlub | H04B 1/3838 455/522 |
| 2014/0328488 A1* | 11/2014 | Caballero | H04R 3/00 381/58 |

FOREIGN PATENT DOCUMENTS

| | | |
|---|---|---|
| CN | 103067600 | 4/2013 |
| CN | 103179271 | 6/2013 |
| CN | 103369142 | 10/2013 |
| TW | 201246990 | 11/2012 |

\* cited by examiner

METHOD FOR PREVENTING CALL-UP OPERATION ERRORS AND SYSTEM USING THE SAME

BACKGROUND OF THE INVENTION

Field of Invention

The present invention relates to a technical field of mobile phones, and more particularly to a method for preventing call-up operation errors and a system using the same.

Description of Prior Art

When a user holds a mobile phone closely to the ear during a phone call, if a proximity sensor of the mobile phone detects an obstruction shielding the proximity sensor, the mobile will shut off the display screen and the touchscreen of the mobile, which prevents call-up operation errors of the mobile phone including hang-up by the face of the user touching the touchscreen. Currently, the size of the screen of the mobile phone becomes larger and larger, and due to the consideration of the manufacturing cost, the proximity sensor is set to an offset to the left side or right side of the mobile phone, rather than is installed in the central location on the top portions of the mobile phones. Moreover, during the phone calls, particularly in some environments such as in a noisy environment, users incline to put mobile phones more closely to their ears and adjust the positions of the mobile phones, which makes the proximity sensor of the mobile phone exposed out of the obstruction; and when this happens, the touchscreen of the mobile phone is on, which may cause by call-up operation errors.

SUMMARY OF THE INVENTION

In order to overcome the above-mentioned drawbacks and deficiencies, a first objective of the present invention is to provide a method by dynamically adjusting the emitting power of the proximity sensor for preventing the call-up operation errors.

A second objective of the present invention is to provide a system by dynamically adjusting the emitting power of the proximity sensor for preventing the call-up operation errors.

The present invention employs the following technical scheme.

A method for preventing call-up operation errors comprises following steps:

(S1) during a phone call, a proximity sensor continuously detecting a proximity or distant state of an obstruction;

(S2) when detecting that the obstruction approaches, uploading the proximity state in a drive program to an upper layer, and shutting off the touchscreen and lighting off the display screen when the upper layer receives the proximity state of the obstruction;

(S3) when the proximity sensor detecting that the obstruction moves far away, skipping reporting the distant state at this time, and increasing the transmission power of the proximity sensor;

(S4) based on the increased transmission power of the proximity sensor, determining whether the reflection intensity exceeds a setting threshold at this time, that is, determining whether the obstruction is in a proximity state, and if the reflection intensity exceeds the setting threshold, it means the obstruction is near the proximity sensor of the mobile phone, and if detecting no reflection signal, it means the obstruction has been far away from the proximity sensor;

(S5) if the obstruction is near the proximity sensor of the mobile phone, the proximity sensor skips uploading the distant state, and the display screen will not light up since the upper layer receives no distant state, if the obstruction is far away from the proximity sensor of the mobile phone, the proximity sensor uploading the distant state which means the mobile phone is far away from the obstruction, and then lighting up the display screen.

Preferably, in step S4, the transmission power can be adjusted by adjusting the current of a circuit, and the current can be automatically adjusted to a 100 mA (milliampere) gear position.

Preferably, in step S4, the setting threshold is in a range of 800-1000, and the setting threshold may be read from a register and the setting threshold has no unit.

Preferably, the setting threshold of the transmission power can be set by writing a predetermined value to the register of the proximity sensor.

Preferably, the obstruction is a face or arms of a user.

Preferably, in step S2, when shutting off the touchscreen, the touchscreen is turn off at the same time.

Preferably, in step S4, the proximity sensor turns off when the obstruction is in the distant state.

For the second objective, the present invention uses the following technical scheme.

A system for preventing call-up operation errors using the above-mentioned method, the system comprises:

a proximity sensor, continuously detecting a proximity or distant state of an obstruction during a phone call;

a proximity state uploading module, uploading the proximity state in a drive program to an upper layer when detecting that the obstruction approaches, and shutting off the touchscreen when the upper layer receives the proximity state;

a power-amplifying module, first skipping reporting the distant state at this time by the proximity sensor when detecting that the obstruction moves far away, and increasing the transmission power of the proximity sensor;

a threshold-comparing module, determining whether the reflection intensity signal exceeds a setting threshold at this time based on the increased transmission power of the proximity sensor in order to determine whether the obstruction is near the proximity sensor of the mobile phone in a proximity state or has been far away from the proximity sensor in a distant state; and a processing module, processing respectively according to a proximity state or a distant state of the obstruction, based on a comparison result of the threshold-comparing module, if the obstruction is near the proximity sensor of the mobile phone, the proximity sensor skips uploading the distant state, and the display screen remains off, if the obstruction is far away from the proximity sensor of the mobile phone, the proximity sensor uploading the distant state and then lighting up the display screen.

In one preferred embodiment, the threshold-comparing module is operated in the following manners:

Within a range of the setting threshold, when reflection signal can be detected, it means that the obstruction is in a proximity state; if no reflection signal can be detected, increasing the transmission power of the proximity sensor to be the setting threshold, and continue to detecting reflection signal, and if no reflection signal can be detected, it means the obstruction has been moved away.

Preferably, the system further comprises a threshold-setting module for adjusting the setting threshold of the transmission power by writing a predetermined value to the register of the proximity sensor.

In comparison to conventional techniques, the present invention provides the following advantages and effectiveness:

1. The present invention solves the following problem: when the proximity sensor is exposed out of the obstruction, the transmission power of the proximity sensor is increased to determine whether the mobile phone is near the face, and if the mobile phone is near the face, the display screen remains off in order to decreasing the risk of the call-up operation errors.

2. The call-up operation errors can be efficiently prevented without additional elements, so that the manufacturing cost of the mobile phone is reduced advantageously.

DETAILED DESCRIPTION OF THE PREFERRED EMBODIMENTS

The following embodiments refer to the accompanying drawings for exemplifying specific implementable embodiments of the present invention. It should be noted that the exemplary described embodiments are used to describe and understand the present invention, but the present invention is not limited thereto.

Figure 1:
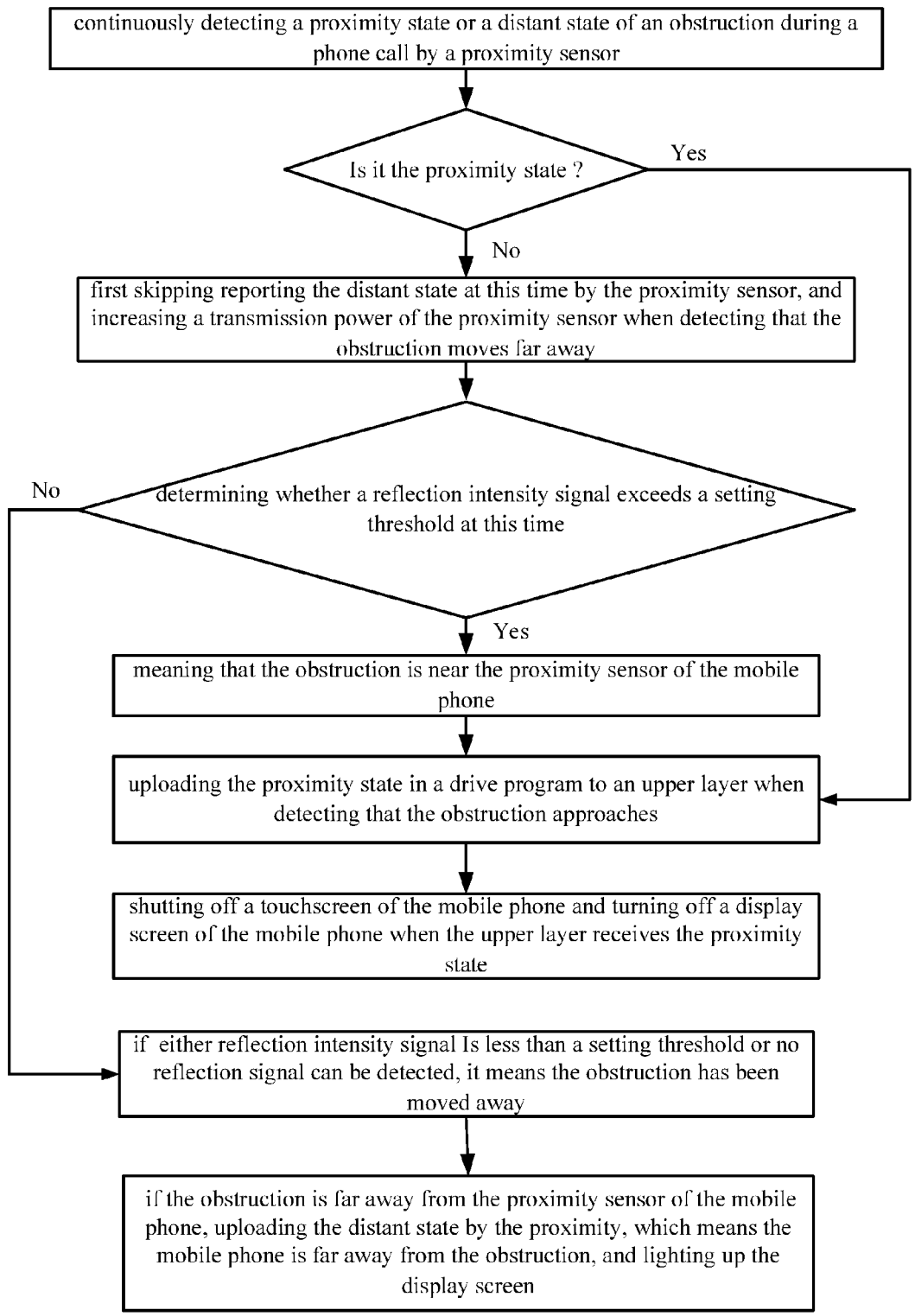
FIG. 1 is a flow chart of a method for preventing call-up operation errors according to one exemplary embodiment of the present invention.

Please refer to FIG. 1, which is a flow chart of a method for preventing call-up operation errors while the user makes a phone call according to one exemplary embodiment of the present invention. The method comprises the following steps.

In step 1, during a phone call, when the proximity sensor detects that the obstruction approaches, the proximity sensor uploads the proximity state in a drive program to an upper layer, and the mobile phone shuts off the touchscreen and will not light up the display screen when the upper layer receives the proximity state.

The proximity sensor operates on the principle of reflection of infrared light such that the proximity sensor uses the reflection intensity of the infrared light to calculate and determine the distance between the obstruction and the proximity sensor. If the reflection intensity of the infrared light is greater than a setting threshold, it means that the obstruction is approaching the proximity sensor to the proximity state. If the reflection intensity of the infrared light is less than the setting threshold, it means that the obstruction is distant or moved away from the proximity sensor in the distant state. In one embodiment, the setting threshold is in a range from 800 to 1000. The setting threshold is a pure number read from a register and has no unit.

In a conventional manner, when the proximity sensor detects that the obstruction is distant or moved away from the proximity sensor with a predetermined distance, the proximity sensor reports the distant state to the top control layer. When the top control layer receives such distant state, the top control layer turns on the function of the touchscreen of the mobile phone and lights up the display screen. However, in step 2 of the present invention, when the proximity sensor detects the distant state of the obstruction, the proximity sensor first skips reporting the separation of the proximity state to the top control layer but increases a transmission power of the proximity sensor, which is capable of expanding the detection region of the proximity sensor.

Usually, the operating electric current of a proximity sensor is 25 mA (milliampere), 50 mA or 100 mA. The proximity sensor with the operating electric current 50 mA is normally used. However, the present invention uses the proximity sensor with the operating electric current 100 mA, whereby the electric current applied to the proximity sensor can be automatically increased to the 100 mA gear position. In the present invention, it is required that the transmission power of the proximity sensor is amplified to magnify the reflection intensity of the infrared light for detecting whether the obstruction is separated from the proximity sensor with the predetermined distance during or after the phone call. In the embodiment of the present invention, the setting threshold of the transmission power can be set by writing a predetermined value to the register of the proximity sensor.

In step 3, based on the increased transmission power of the proximity sensor, it is determined whether the reflection intensity signal exceeds a setting threshold at this time, that is, it is determined whether the face of the user is in the proximity state. If the reflection intensity exceeds the setting threshold, it means the obstruction is near the proximity sensor of the mobile phone, and if the reflection signal is not detected, it means the obstruction has been far away from the proximity sensor.

In step 4, if the obstruction is near the proximity sensor of the mobile phone, the proximity sensor skips uploading the distant state, and the display screen will not light up since the upper layer receives no distant state. If the obstruction is far away from the proximity sensor of the mobile phone, the proximity sensor uploads the distant state which means the mobile phone is far away from the obstruction, and then lights up the display screen.

Figure 2:
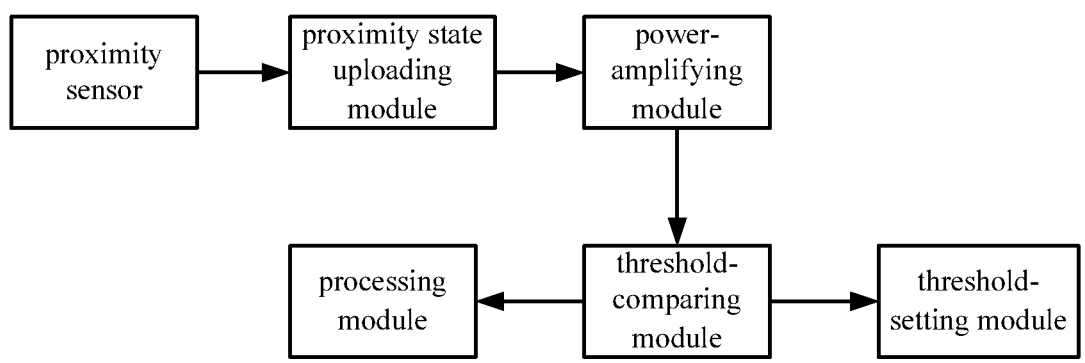
FIG. 2 is a block diagram of a system for preventing call-up operation errors according to one exemplary embodiment of the present invention.

Please refer to FIG. 2, which is a schematic structural block diagram of a system for preventing call-up operation errors while the user makes the phone call according to one exemplary embodiment of the present invention. The system for preventing call-up operation errors while the user makes the phone call includes:

a proximity sensor, for continuously detecting a proximity or distant state of an obstruction during a phone call;

a proximity state uploading module, uploading the proximity state in a drive program to an upper layer when detecting that the obstruction approaches, and shutting off the touchscreen when the upper layer receives the proximity state;

a power-amplifying module, first skipping reporting the distant state at this time by the proximity sensor when detecting that the obstruction moves far away, and increasing the transmission power of the proximity sensor by the power-amplifying module;

a threshold-comparing module, for determining whether the reflection intensity signal exceeds a setting threshold at this time based on the increased transmission power of the proximity sensor in order to determine whether the obstruction is near the proximity sensor of the mobile phone in a proximity state or has been far away from the proximity sensor in a distant state; and a processing module, processing respectively according to the proximity state or the distant state of the obstruction, based on a comparison result of the threshold-comparing module, if the obstruction is near the proximity sensor of the mobile phone, the proximity sensor skips uploading the distant state, and the display screen remains off, if the obstruction is far away from the proximity sensor of the mobile phone, the proximity sensor uploading the distant state and then lighting up the display screen.

The threshold-comparing module is operated in the following manners: within a range of the setting threshold, when the reflection signal can be detected, it means that the obstruction is in the proximity state; if no reflection signal can be detected, increasing the transmission power of the proximity sensor to be the setting threshold, and continue to detecting the reflection signal, and if no reflection signal can be detected, it means the obstruction has been moved away.

In this embodiment, the system further comprises a threshold-setting module for adjusting the setting threshold of the transmission power by writing a predetermined value to the register of the proximity sensor. Such a setting threshold can be modified to meet different requirements.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A method for preventing call-up operation errors by a mobile phone, the method comprising the steps of:
   (S1) continuously detecting a proximity state or a distant state of an obstruction during a phone call by a proximity sensor;
   (S2) uploading the proximity state in a drive program to an upper layer when detecting that the obstruction approaches, and shutting off a touchscreen function of the mobile phone and turning off a display screen light of the mobile phone when the upper layer receives the proximity state;
   (S3) first skipping reporting the distant state at this time by the proximity sensor, and increasing a transmission power of the proximity sensor when detecting that the obstruction moves away after the obstruction approaches and after the touchscreen function of the mobile phone shuts off and the display screen light of the mobile phone turns off;
   (S4) determining whether a reflection intensity signal exceeds a setting threshold at this time based on the increased transmission power of the proximity sensor to decide whether the obstruction is in the proximity state when detecting that the obstruction moves away after the obstruction approaches and after the touchscreen function of the mobile phone shuts off and the display screen light of the mobile phone turns off, and if the reflection intensity exceeds the setting threshold, it means that the obstruction is near the proximity sensor of the mobile phone, and if no reflection signal is detected, it means that the obstruction has been far away from the proximity sensor, wherein the setting threshold of the transmission power is set by writing a predetermined value to a register of the proximity sensor; and
   (S5) skipping uploading the distant state by the proximity sensor if the obstruction is near the proximity sensor of the mobile phone wherein the display screen light is turned off since the upper layer does not receive the distant state, and if the obstruction is far away from the proximity sensor of the mobile phone, uploading the distant state by the proximity, which means the mobile phone is far away from the obstruction, and the display screen light is turned on.

2. The method for preventing call-up operation errors of claim 1, wherein during the step (S4), the transmission power is adjusted by adjusting the current of circuit, and the current is automatically adjusted to a 100 mA (milliampere) gear position.

3. The method for preventing call-up operation errors of claim 1, wherein during the step (S4), the setting threshold is in a range of 800-1000, and the setting threshold is read from a register and the setting threshold has no unit.

4. The method for preventing call-up operation errors of claim 1, wherein the obstruction is a face or arms of a user.

5. The method for preventing call-up operation errors of claim 1, wherein during the step (S2), when shutting off the touchscreen, the display screen light is turned off at the same time.

6. The method for preventing call-up operation errors of claim 1, wherein during the step (S4), turning off the proximity sensor when the obstruction is in the distant state.

7. A system for preventing call-up operation errors, the system comprising:
   a proximity sensor, for continuously detecting a proximity or distant state of an obstruction during the phone call;
   at least one processor; and
   a memory connected to the at least one processor, the memory comprising a plurality of program instructions executable by the at least one processor, the program instructions comprising:
   uploading the proximity state in a drive program to an upper layer when the proximity sensor detects that the obstruction approaches, and shutting off a touchscreen function when the upper layer receives the proximity state;
   first skipping reporting the distant state at this time when the proximity sensor detects that the obstruction moves away after the obstruction approaches and after the touchscreen function of the mobile phone shuts off and the display screen light of the mobile phone turns off, and increasing a transmission power of the proximity sensor;
   comparing whether a reflection intensity signal exceeds a setting threshold at this time based on the increased transmission power of the proximity sensor in order to determine whether the obstruction is near the proximity sensor of a mobile phone in a proximity state when detecting that the obstruction moves away after the obstruction approaches and after the touchscreen function of the mobile phone shuts off and the display screen light of the mobile phone turns off, or has been far away from the proximity sensor in a distant state, wherein the setting threshold of the transmission power is set by writing a predetermined value to a register of the proximity sensor; and
   processing either the proximity state or the distant state of the obstruction, based on a comparison result, if the obstruction is near the proximity sensor of the mobile phone, skipping uploading the distant state to keep the display screen light off, and if the obstruction is far away from the proximity sensor of the mobile phone, uploading the distant state to turn on the display screen light.

8. The system for preventing call-up operation errors of claim 7, wherein when comparing whether the reflection intensity signal exceeds the setting threshold at this time based on the increased transmission power of the proximity sensor, the program instructions further comprise that:

within a range of the setting threshold, when the reflection signal is detected, it means that the obstruction is in the proximity state; if no reflection signal is detected, increasing the transmission power of the proximity sensor to be the setting threshold, and continue to detecting the reflection signal, and if no reflection signal is detected, it means the obstruction has been moved away.

9. The system for preventing call-up operation errors of claim 7, wherein the program instructions further comprise adjusting the setting threshold of the transmission power by writing a predetermined value to the register of the proximity sensor.

10. The system for preventing call-up operation errors of claim 7, wherein the transmission power is adjusted by adjusting the electric current of a circuit, and the current is automatically adjusted to a 100 mA gear position.

11. The system for preventing call-up operation errors of claim 7, wherein the setting threshold is in a range of 800-1000, and the setting threshold is read from a register and the setting threshold has no unit.

12. The system for preventing call-up operation errors of claim 7, wherein the obstruction is a face or arms of a user.

13. The system for preventing call-up operation errors of claim 7, wherein the mobile phone shuts off the touchscreen function and turns off the display screen light of the mobile phone.

14. The system for preventing call-up operation errors of claim 7, wherein the proximity sensor turns off when the obstruction has been moved far away.

\* \* \* \* \*